UNITED STATES PATENT OFFICE.

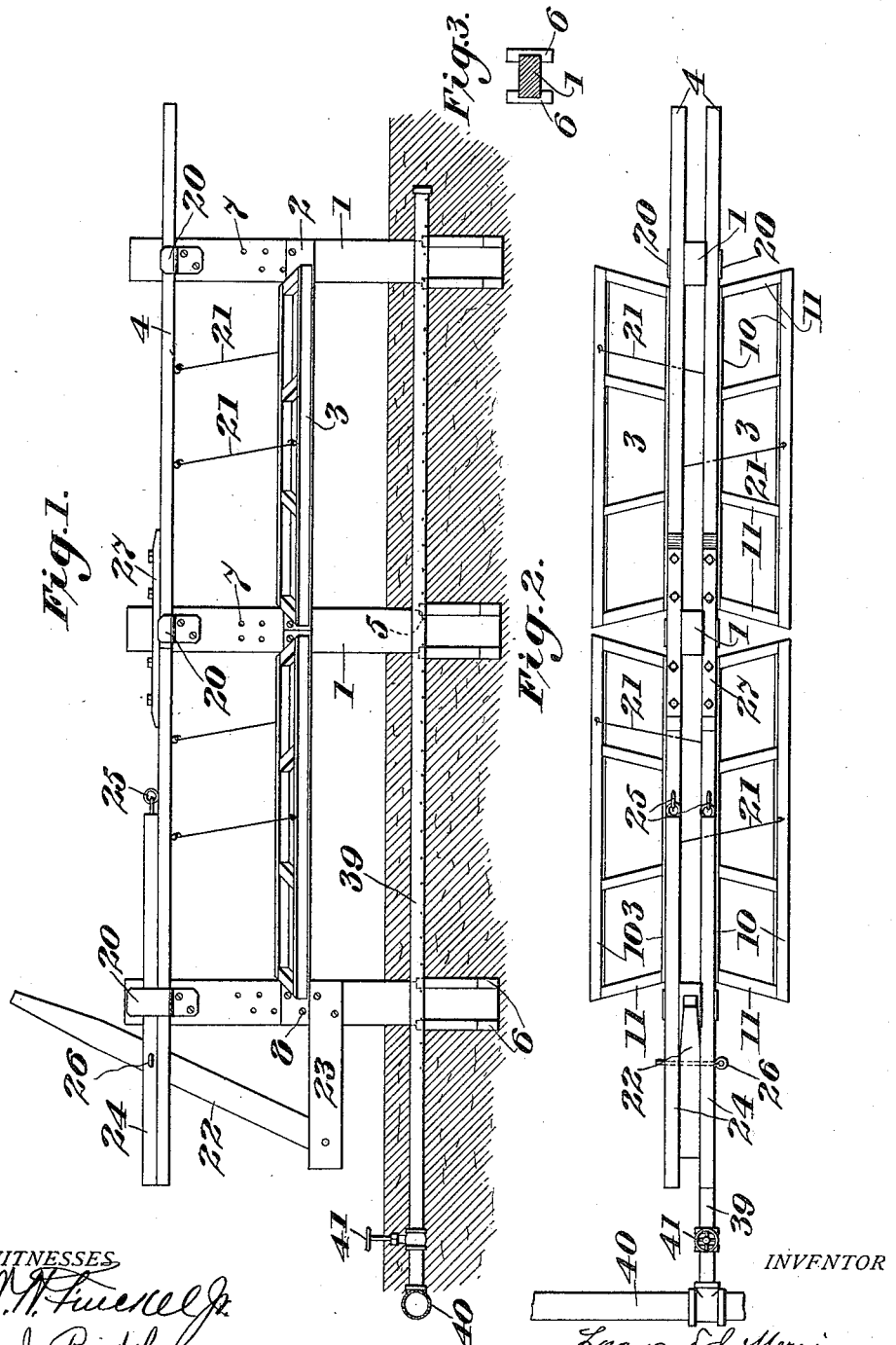

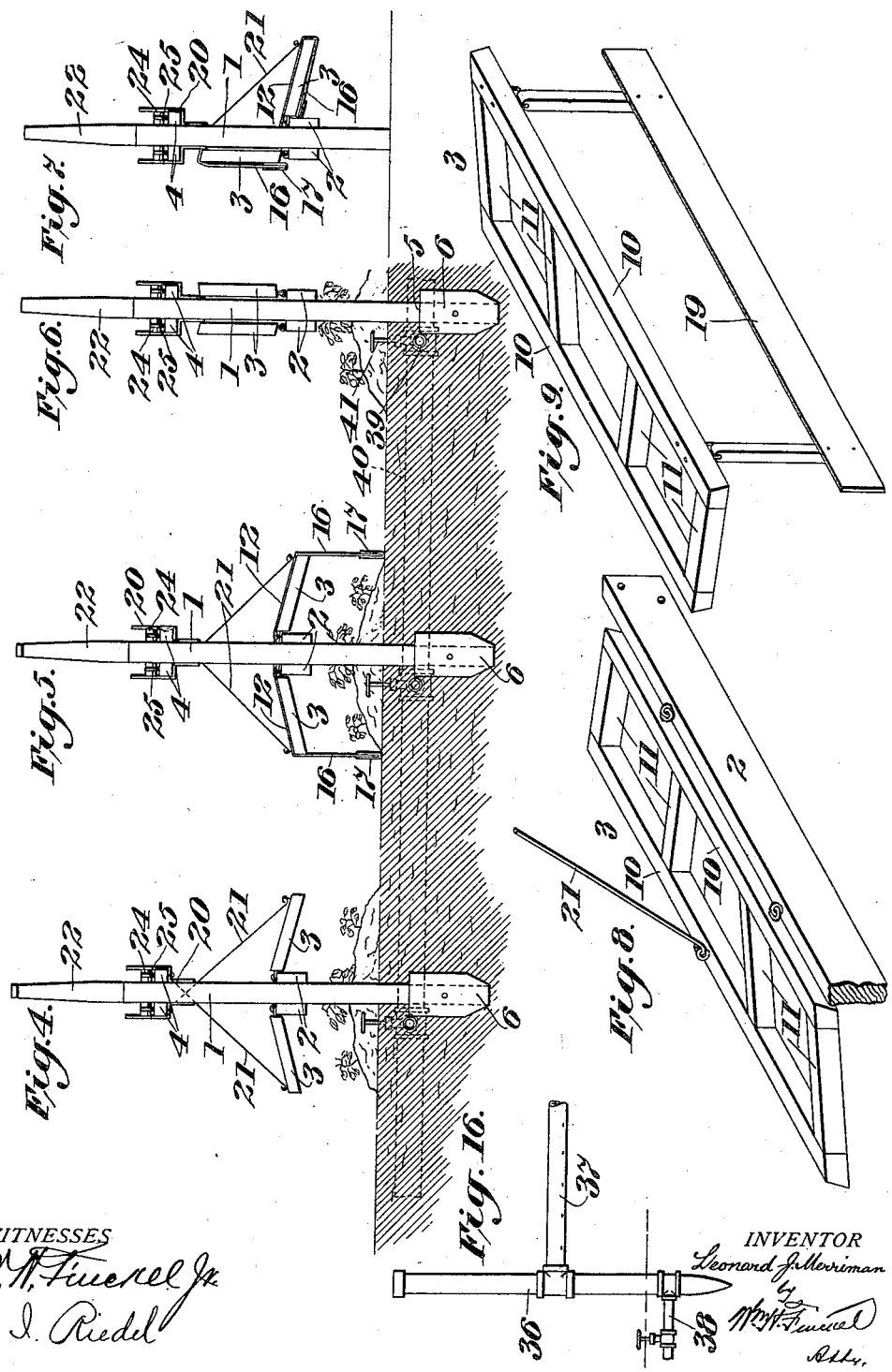

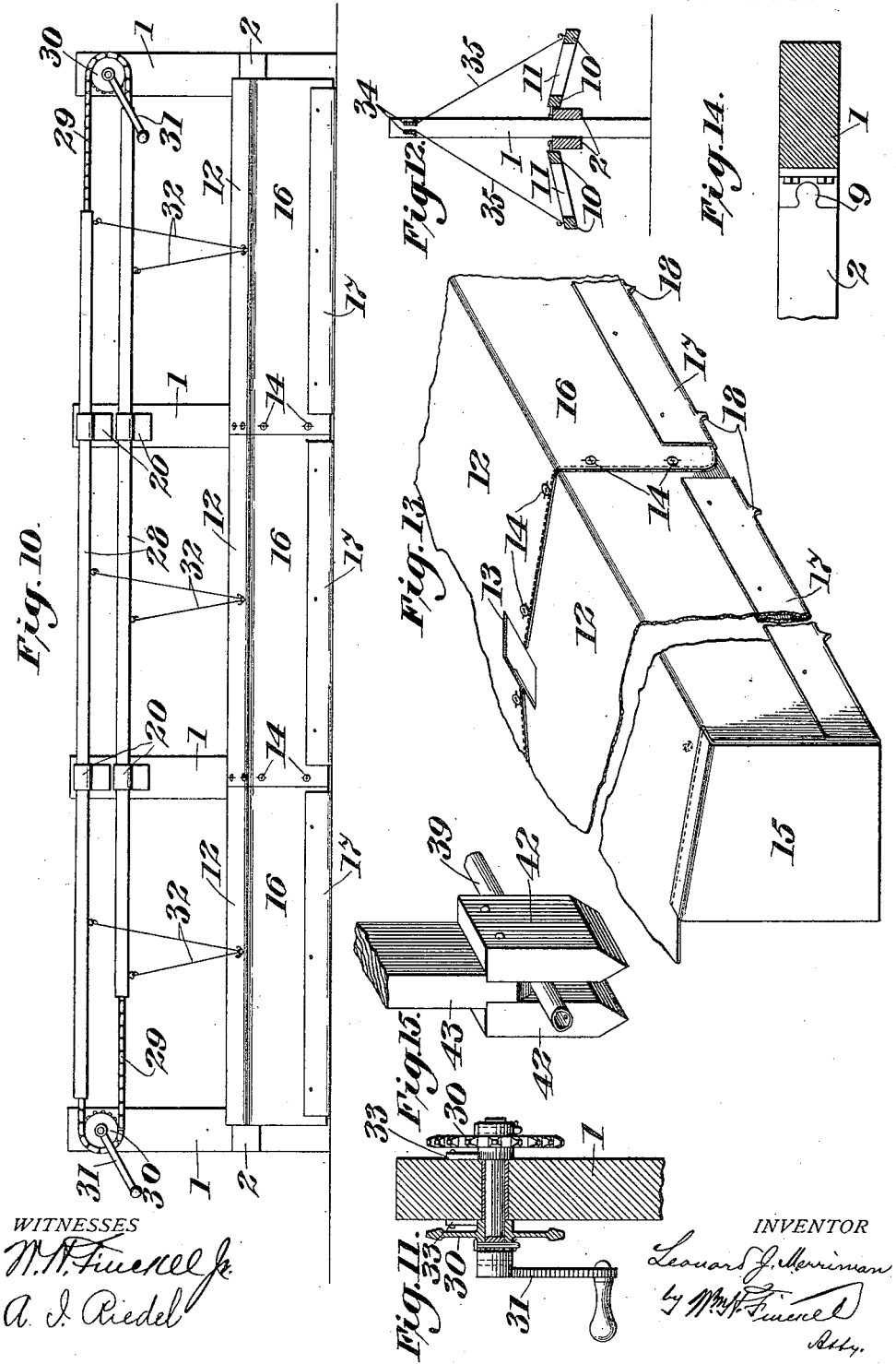

LEONARD J. MERRIMAN, OF WILMINGTON, NORTH CAROLINA.

PLANT-COVER.

1,144,663.  Specification of Letters Patent.  Patented June 29, 1915.

Application filed August 14, 1914.  Serial No. 856,880.

*To all whom it may concern:*

Be it known that I, LEONARD J. MERRIMAN, a citizen of the United States, residing at Wilmington, in the county of New Hanover and State of North Carolina, have invented a certain new and useful Improvement in Plant-Covers, of which the following is a full, clear, and exact description.

The object of this invention is to provide a convenient, efficient, durable and economical means for use in developing seeds and growing plants under most favorable conditions of wind, weather, temperature and light, and for other purposes, such as drying fruits and vegetables.

The invention consists in one of its main aspects, of a plant covering means capable of ready installation over growing plants and susceptible of movement while in place so as to fully inclose the plants, or partly expose them, or fully expose them as circumstances may require; the covers being of such character as to permit of the full utilization of cultivating and harvesting implements or machinery without disturbing such covers.

In the accompanying drawings illustrating the invention, in the several figures of which like parts are similarly designated, Figure 1 is a side elevation with the covering wings extended horizontally or in covering position. Fig. 2 is a top plan view. Fig. 3 is a horizontal cross-section of one of the posts above its bottom. Fig. 4 is an end elevation. Fig. 5 is an end elevation with the textile covering in covering position. Fig. 6 is an end elevation with the wings folded up. Fig. 7 is an end elevation showing one wing folded up and the other extended. Fig. 8 is a perspective view of one of the wing frames and part of a rail or beam upon which it moves. Fig. 9 is a perspective view of a wing frame provided with an auxiliary side flap frame. Fig. 10 is a side elevation showing a modified operating mechanism. Fig. 11 is a sectional detail, on a larger scale, of part of the operating mechanism. Fig. 12 is a vertical section illustrating another form of operating means. Fig. 13 is a fragmentary perspective view of the textile covering. Fig. 14 is a sectional plan view of a modification of the post and rail. Fig. 15 is a perspective view of a modification of the post anchoring means. Fig. 16 is an elevation of part of a frame made of tubes and capable of use for spraying.

The invention is capable of embodiment in a great variety of forms, for special uses, or in connection with different forms of vegetable life or products, but for a concrete example and for purposes of illustrating the principle of the invention I will proceed to describe it as used in connection with growing plants arranged in straight rows, the rows running east and west. While the covers may be of any length, it is preferred to make them in units or sections of uniform length, so that they may be knocked-down and packed in small spaces for convenience and economy in transportation, and may be readily and cheaply set up, repaired and renewed in the field or otherwise. Furthermore, while wood may be most economically used in constructing the frame of the covers, it is permissible to use metal in angular or tubular form; and while the covers may be operated by hand, it is within the invention to use power of any sort.

Posts 1, rails, beams or connecting pieces 2 detachably applied to these posts, wing frames 3 hingedly connected to the rails or beams 2, and pull-pieces 4 slidingly mounted upon the posts, combine to form separate units of a sectionized cover, the units or sections being multiplied to cover a row of plants of any length, and when united being capable of operation as a whole.

The posts 1 preferably are oblong in cross section so that they may be set or planted broad-side parallel with the row of plants and in the direction of motion of the operating mechanism to thereby best support such mechanism and withstand strains. The narrow sides are recessed at 5 near their bottoms, and in these recesses are placed stakes 6 having their broader sides arranged at right angles to the broader sides of the posts, so that when buried in the earth, these stakes serve to anchor the posts and afford sufficient resistance to meet the ordinary strains to which the bottoms of the posts are subjected in use. Any other post anchoring device may be used instead of the stakes without departing from the scope of the invention.

At any suitable height above the ground are the rails or beams 2 secured in any suitable way to the posts, so as to connect the posts in series, rigidly brace them, and maintain them in alinement. As shown in Fig. 1 the posts may be provided with a series of holes 7, to provide for adjusting the height of the rails or beams. As shown these rails or beams are used in pairs and secured to the posts in a detachable manner, as by bolts 8. These rails extend from one post to the next post so that any number of posts may be connected up in series and also so that the cover may be made in sections or units for transportation and other purposes. Various modifications of the construction are permissible, as for example, replacing the pairs of rails by a single rail extending between the edges of the posts and connected to the posts by any suitable connection, such as the tongue and socket 9 shown in Fig. 14.

To the rails 2 are hinged the wing frames 3 herein shown as composed of parallel wooden bars 10 connected by the cross-pieces 11. Wing frames of the character described are hingedly connected to the rails on opposite sides of the posts and in such way that both or either of them may be swung downwardly therefrom substantially horizontally or turned or folded up against the posts substantially vertically. These wing frames are provided with coverings 12 of any suitable material that will intercept the sun's rays and yet not wholly exclude the light and air, and will break the force of rain drops even though it may not be wholly impervious, and will also serve to protect the plants from the injurious effects of frost and cold winds. Textile material, such as cotton cloth, subserves these purposes, but other substantially translucent material may be used according to climate. As shown these coverings preferably are in units to correspond with the frame units, although it is within the invention to make a single continuous covering of any given length and fit it over the posts by making the proper recesses therein, such as indicated at 13 in Fig. 13. If the coverings are made in units, their edges may be made to overlap, and they are provided with any suitable connecting mediums, such as buttons and buttonholes 14, as indicated in Fig. 13, or snap fasteners or any other suitable connecting mediums. The coverings for end sections may be provided with end flaps 15 as indicated in Fig. 13. All of the coverings are provided with side flaps 16 adapted to hang normally over the outer edges of the wing frames 3. These longitudinal side flaps may be provided with edge reinforces 17, and these reinforces may be of folded sheet metal riveted or otherwise fastened to the cloth and of sufficient weight to hold the flaps in position, or such reinforces may be of any other suitable material, such as thin boards. If desired, the side flaps 16 may be provided with any suitable projections as 18 which may enter the ground in order to hold the flaps against the action of the wind and so that they may not come in contact with the plants. Furthermore these side flaps may be fastened to the outer edges of the wing frames, by any suitable means, in order to prevent them from being displaced accidentally, as by wind.

If desired, and as shown in Fig. 9, the frames 3 may be provided with side frames 19 hingedly connected to their outer edges and to which the side flaps of the cover may be fastened. These hinged sides may be so applied to the frames 3 that when these frames 3 are lowered into their horizontal or covering position, the side frames may hang down vertically therefrom, and when said frames 3 are moved into their vertical or uncovering position, the side frames 19 will fold up against them.

The posts are provided on their broader sides with opposite brackets 20, in which are arranged pairs of horizontal pull-pieces 4, and these pull-pieces are connected with the wing frames 3 by rigid connecting links 21 which are jointed to the outer edges of the frames 3 and cross over from frame 3 on one side to pull-pieces 4 on the opposite side in oblique manner so as to be immediately responsive to the longitudinal movement of the pull-pieces. These connecting links 21 might be arranged straight instead of oblique, but in that case there might be a little lost motion to be compensated for. These links serve both to pull and to push, and also to hold the wings at any angle or in any desired position. Various means may be used for imparting longitudinal movement to the pull-pieces, but for purposes of illustration, I have shown only three such means.

Referring to Figs. 1 to 7 inclusive, the operating mechanism comprises a lever 22 fulcrumed upon a bracket 23 extending horizontally from one of the end posts, and this lever is secured between and to a pair of radius bars 24 which are pivotally applied at 25 to the pull-pieces 4. Preferably the lever 22 is applied to the radius bars 24 by a detachable medium, such as a pin 26, so that when the said pin passes through both of the radius bars and the lever as well, any movement of the lever will move both of the pull-pieces, and in so moving both of these pull-pieces, the connecting links 21 will be acted upon and will draw up the frames from a horizontal position, shown in Figs. 1, 2, 4 and 5, into a vertical position, shown in Fig. 6, or upon a reverse movement of the pull-pieces the frames will be let down from the vertical into the horizontal position. In case it is desired to uncover only one side of the row of plants, as for example the southern exposure, then the pin 26 is moved so that the lever will be connected to only one of the radius bars, and consequently to only one of the pull-pieces, and the frames 3 on one side of the row only will be lifted as shown in Fig. 7. As shown, the pull-pieces 4 are also made on the unit or section plan, and these units are connected in any suitable detachable way, as by connecting pieces 27, bolted or otherwise secured thereto.

The second form of operating mechanism for the pull-pieces is shown in Figs. 10 and 11. In this case the pull-pieces are parallel horizontal bars 28 arranged one above the other on each side of the posts, in brackets as before, and these pull-pieces 28 may be sectionized as before. The pull-pieces are connected by a flexible connecting medium, such as chains 29, at opposite ends, the pairs of pull-pieces on each side of the posts being connected in pairs by such connecting mediums, 29, and these connecting mediums are supported upon pulleys or sprocket wheels 30, adapted to be driven by a crank 31, and the pulleys or sprocket wheels on opposite sides of the posts being so mounted as to be inoperative on one side or the other of the posts as it may be desired to lift the frames on one or the other side of the posts (see Fig. 11). These pull-pieces may be connected with the frames by obliquely or otherwise arranged connecting links, or the frames may be connected with the pull-pieces by means of pairs of links 32 both of which are connected at the same point with the frames but at different points with the pull-pieces, as shown in Fig. 10, so that as these pull pieces are moved in opposite directions the links 32 will be actuated and the frames lifted or lowered as desired. This movement carries the connecting links in opposite directions equally, causing the horizontal wings to raise and lower without any horizontal-friction on the rails or center beams. As shown in Fig. 11 pawls and ratchets 33 may be used to hold the operating mechanism in any given position.

A third form of wing-operating means is shown in Fig. 12. In this construction the pull-pieces 34, are arranged in slots in the posts and instead of crossing the connecting links, these links 35 are applied to the pull-pieces on the same side as the wings to which they are attached. These pull-pieces may be reciprocated by either of the means previously described or other means appropriately connected therewith.

As indicated in Fig. 16, the posts 36 and rails or beams 37 may be tubular, and the posts connected with a water supply 38 and the rails perforated so that the parts constituting the frame of the cover may be utilized to spray the plants.

I prefer to use in connection with the invention herein disclosed for covering the plants, an underground or subsurface irrigating system, comprising perforated pipes 39, connected to the main 40, and each pipe is provided with its own valve 41 so that any individual row of plants, or any number of rows of plants, or the whole field of rows of plants may be watered as desired.

As shown in Fig. 15 the subsurface irrigating pipe 39 may be held in place between stakes 42, applied to opposite sides of the posts 43, so as to be incapable of rising or escaping laterally and reciprocally serving to support the posts against sinking in the earth and from leaning or falling over.

The details of construction may be modified not only as herein described, but otherwise, and to any desired extent without departing from the spirit and scope of the invention.

The sectionizing of the covers facilitates their manufacture and effects an economy in manufacture, but it is especially valuable in facilitating the setting up of the covers in the field in rows of any length. The provision of movable side flaps, and also the provision of the horizontal frames against which the side flaps may be folded up as indicated in Fig. 6, permits the cultivation of the plants and harvesting the crops without removing the covers. When the side flaps are folded up as indicated at the right in Fig. 7, they would be maintained in that position by any suitable fastening mediums for connecting them with the under sides of the frames. The covering and uncovering of the plants in nowise obstructs the passageway between the rows of plants.

Not only is the invention applicable for use in covering or protecting growing plants, but it is also useful as a cover for the out-of-doors drying of fruits or vegetables, the material to be dried being suitably supported in or upon shelves, trays or other supports arranged in connection with the covers.

A main advantage of the invention is that the supporting frame made in sections or units may be extended indefinitely, and the whole row, no matter what its length, may be operated by a single person from a single point at one time, and further that both the raising of the covers and the lowering thereof are positively performed; the horizontal reciprocation of the pull-pieces being converted into a pivotal movement of the frames on their hinges. The provision of anchoring devices on the posts and the use of the connecting rails makes each unit so stiff as to require no additional braces. The crossing of the connecting bars or rods from the wings on one side to the pull-piece on the opposite side of the posts equalizes the strains on the posts. The reinforcing of the bottom edges of the side flaps keeps the flaps off of the ground and prevents or retards their rotting, and also serves to put sufficient tension on the covering to hold it tight over the frame. The covers when once placed in position in a field may so remain throughout the year, and need not be removed. In this way they may be used for a succession of crops. As indicated in Figs. 4, 5 and 6, these covers may be of a size to cover a number of rows of plants set in a common row or hill. By making the covering separate from the wings it is possible to readily apply and remove it and to stow it away when not in use.

It is to be understood that by the use of the term "plant" herein and in the claims it is not intended to limit the use of the invention.

What I claim is:—

1. A plant cover, having posts and means to connect said posts rigidly in line with one another, wings hingedly connected with the posts and adapted to be folded up against them and to be let down so as to extend outwardly from them, and having coverings, and means to raise and lower said wings simultaneously into the said positions.

2. A plant cover, having posts and means to connect said posts rigidly, foldable wings having coverings, means to connect the posts and wings and means to raise and lower said wings simultaneously or independently.

3. A plant cover, having posts, means to anchor them firmly in the earth, connections for said posts adapted to hold them in rigid alinement, wings hingedly mounted on opposite sides of the posts, a translucent covering on said wings, rigid pull-pieces slidably mounted on the posts above the wings, rigid connecting links jointed at their opposite ends to the pull-pieces and wings, and means to move said pull-pieces simultaneously or independently to raise and lower the wings and thereby uncover and cover the objects beneath the wings.

4. A plant cover, comprising a number of units composed of posts adapted to be anchored in the earth vertically, detachable connections adapted to connect the posts in unitary sections and in series of sections, wings hingedly applied to each unit or section on its opposite sides and provided with coverings, rigid pull-pieces mounted upon the posts and adapted to be rigidly connected from section to section, rigid connecting links jointed at opposite ends to the pull-pieces and wings, and operating means common to the pull-pieces and adapted to move said pull-pieces in right lines conjointly or separately to raise and lower the wings of all of the sections on both or either of the sides of the posts throughout the entire series of connected sections.

5. A plant cover, comprising a number of units composed of posts adapted to be anchored in the earth vertically, detachable rigid connections adapted to connect the posts in unitary sections and in series of sections, wings hingedly applied to each unit or section on its opposite sides and provided with coverings, rigid pull-pieces mounted upon opposite sides of the posts and adapted to be connected in series from end to end of the cover, rigid connecting links extending from the wings on one side of the posts to the pull-pieces on the other side, and a common operating medium for said pull-pieces adapted to operate either or both of said pull-pieces when it is desired to raise and lower the wings on either or both of the sides of the posts.

6. A plant cover, comprising a number of units composed of posts adapted to be anchored in the earth vertically, detachable rigid connections adapted to connect the posts in unitary sections and in series of sections, wings hingedly applied to each unit or section on its opposite sides and provided with coverings, rigid pull-pieces mounted upon opposite sides of the posts and adapted to be connected in series from end to end of the cover, rigid connecting links extending from the wings on one side of the posts to the pull-pieces on the other side and jointed at their opposite ends to the pull-pieces and wings in oblique direction, and a common operating means adapted to be operatively connected with the pull-pieces to positively raise and lower all of the wings on both sides or all of the wings on either side.

7. A plant cover, comprising a series of posts adapted to be erected upright in the earth, rails rigidly connecting the posts between their ends, wing frames hingedly applied to said rails on opposite sides of the posts, coverings applied to said frames, pull-pieces slidingly mounted upon the posts, rigid links movably connected at their opposite ends to the main frames and pull-pieces, a lever pivoted to one of the posts, radius bars applied to the pull-pieces, and means for connecting the lever with said radius bars.

8. A plant cover, comprising upright posts, rails rigidly connecting the posts between their ends, wing frames hingedly applied to the rails on opposite sides of the posts, coverings for said wing frames, rigid pull-pieces slidingly mounted upon the posts, means to move said pull-pieces longitudinally in a horizontal direction, and rigid links jointed at their opposite ends to the wing frames and pull-pieces and serving to raise and lower the wing frames as the pull-pieces are moved in opposite directions.

9. A plant cover, comprising upright posts, rails rigidly connecting the posts between their ends, wing frames hingedly applied to the rails on opposite sides of the posts, coverings for said wing frames, rigid pull-pieces slidingly mounted upon the posts, means to move said pull-pieces longitudinally in a horizontal direction, and rigid links jointed at their opposite ends to the wing frames and pull-pieces and serving to raise and lower the wing frames as the pull-pieces are moved in opposite directions, and side flaps depending from said wing frames.

10. A plant cover, comprising upright posts, rails rigidly connecting the posts between their ends, wing frames hingedly applied to the rails on opposite sides of the posts, coverings for said wing frames, rigid pull-pieces slidingly mounted upon the posts, means to move said pull-pieces longitudinally in a horizontal direction, and rigid links jointed at their opposite ends to the wing frames and pull-pieces and serving to raise and lower the wing frames as the pull pieces are moved in opposite directions, and reinforced side flaps depending from said wings.

11. A plant cover, comprising upright posts, rails rigidly connecting the posts between their ends, wing frames hingedly applied to the rails on opposite sides of the posts, coverings for said wing frames, rigid pull-pieces slidingly mounted upon the posts, means to move said pull-pieces longitudinally in a horizontal direction, and rigid links jointed at their opposite ends to the wing frames and pull-pieces and serving to raise and to hold at any height the wing frames as the pull-pieces are moved in one direction and to lower the wing frames when moved in the opposite direction, and weighted side flaps depending from said wings and coverings.

12. A plant cover, comprising upright posts, rails rigidly connecting the posts between their ends, wing frames hingedly applied to the rails on opposite sides of the posts, coverings for said wing frames, rigid pull-pieces slidingly mounted upon the posts, means to move said pull-pieces longitudinally in a horizontal direction, and rigid links jointed at their opposite ends to the wing frames and pull-pieces and serving to raise and lower the wing frames as the pull-pieces are moved in opposite directions, and to hold them in such positions, and side flaps applied to said wings and coverings and provided with means for resisting displacement by the elements.

13. A plant cover, comprising upright posts, rails rigidly connecting the posts between their ends, wing frames hingedly applied to the rails on opposite sides of the posts, coverings for said wing frames, rigid pull-pieces slidingly mounted upon the posts, means to move said pull-pieces longitudinally in a horizontal direction, and rigid links jointed at their opposite ends to the wing frames and pull-pieces and serving to raise and lower the wing frames as the pull-pieces are moved in opposite directions, said wing frame coverings provided with side flaps having their lower edges reinforced and protected from decay.

14. A plant cover, comprising upright posts, rails rigidly connecting the posts between their ends, wing frames hingedly applied to the rails on opposite sides of the posts, coverings for said wing frames, rigid pull-pieces slidingly mounted upon the posts, means to move said pull-pieces longitudinally in a horizontal direction, and rigid links jointed at their opposite ends to the wing frames and pull-pieces and serving to raise and lower the wing frames as the pull-pieces are moved in opposite directions, and side flaps depending from the outer edges of the wing frames and adapted to be turned up underneath the wings to shade the plants and also to effect a horizontal exposure.

15. A plant cover, comprising upright posts, rails rigidly connecting the posts between their ends, wing frames hingedly applied to the rails on opposite sides of the posts, coverings for said wing frames, rigid pull-pieces slidingly mounted upon the posts, means to move said pull-pieces longitudinally in a horizontal direction, and rigid links jointed at their opposite ends to the wing frames and pull-pieces and serving to raise and lower the wing frames as the pull-pieces are moved in opposite directions, and side frames jointed to the wing frames and provided with side flap extensions of the coverings.

In testimony whereof I have hereunto set my hand this 1st day of August A. D. 1914.

LEONARD J. MERRIMAN.

Witnesses:
WM. H. FINCKEL,
C. W. FOWLER.

Copies of this patent may be obtained for five cents each, by addressing the "Commissioner of Patents, Washington, D. C."